United States Patent [19]

Stahl

[11] Patent Number: 4,864,872

[45] Date of Patent: Sep. 12, 1989

[54] HYDRAULIC DYNAMOMETER

[76] Inventor: Jere F. Stahl, 1420 E. Philadelphia Street, York, Pa. 17403

[21] Appl. No.: 206,139

[22] Filed: Jun. 13, 1988

[51] Int. Cl.⁴ .............................................. G01L 3/20
[52] U.S. Cl. .................. 73/862.14; 188/296
[58] Field of Search ...................... 75/862.14; 188/296

[56] References Cited

U.S. PATENT DOCUMENTS

| 2,283,244 | 5/1942 | Walker . |
| 2,419,372 | 4/1947 | Schneider .......................... 188/296 |
| 2,672,953 | 3/1954 | Cline . |
| 2,784,728 | 3/1957 | Bathurst et al. . |
| 2,870,875 | 1/1959 | Cline . |
| 3,029,902 | 4/1962 | Jarvis . |
| 3,033,321 | 5/1962 | Evans et al. . |
| 3,062,046 | 11/1962 | Evans . |
| 3,138,954 | 6/1964 | Evans et al. . |
| 3,166,161 | 1/1965 | Hayes . |
| 3,364,736 | 1/1968 | Bathurst et al. . |
| 3,383,910 | 5/1968 | Tanaka . |
| 3,618,377 | 11/1971 | Barker . |
| 3,715,917 | 2/1973 | Bronder . |
| 3,761,196 | 9/1973 | Weinert . |
| 3,945,473 | 3/1976 | Prather et al. . |
| 4,062,233 | 12/1977 | Bonomo . |
| 4,213,332 | 7/1980 | Bonomo et al. . |
| 4,215,569 | 8/1980 | Bonomo et al. . |
| 2,976,9636 | 3/1961 | Bathurst . |

*Primary Examiner*—Charles A. Ruehl
*Attorney, Agent, or Firm*—Luedeka, Hodges & Neely

[57] ABSTRACT

A hydraulic dynamometer which includes a housing defining an interior working compartment and within which an input shaft is journalled. A rotor having a rotor face is mounted on the input shaft for rotation about a shaft axis. A stator is provided in the housing adjacent to the rotor and has a stator face spaced-apart from and facing the rotor face to define a rotor-stator clearance space therebetween. The rotor face has a plurality of rotor pockets and the stator face has a plurality of stator pockets which, when the interior compartment is supplied with liquid, interact with the liquid to brake the rotation of the rotor. Liquid supply passageways are provided so that liquid is supplied into the rotor pockets and is discharged from the stator pockets. A mechanism is provided to adjust the rotor-stator clearance space to adjust the operating characteristics of the dynamometer.

17 Claims, 5 Drawing Sheets

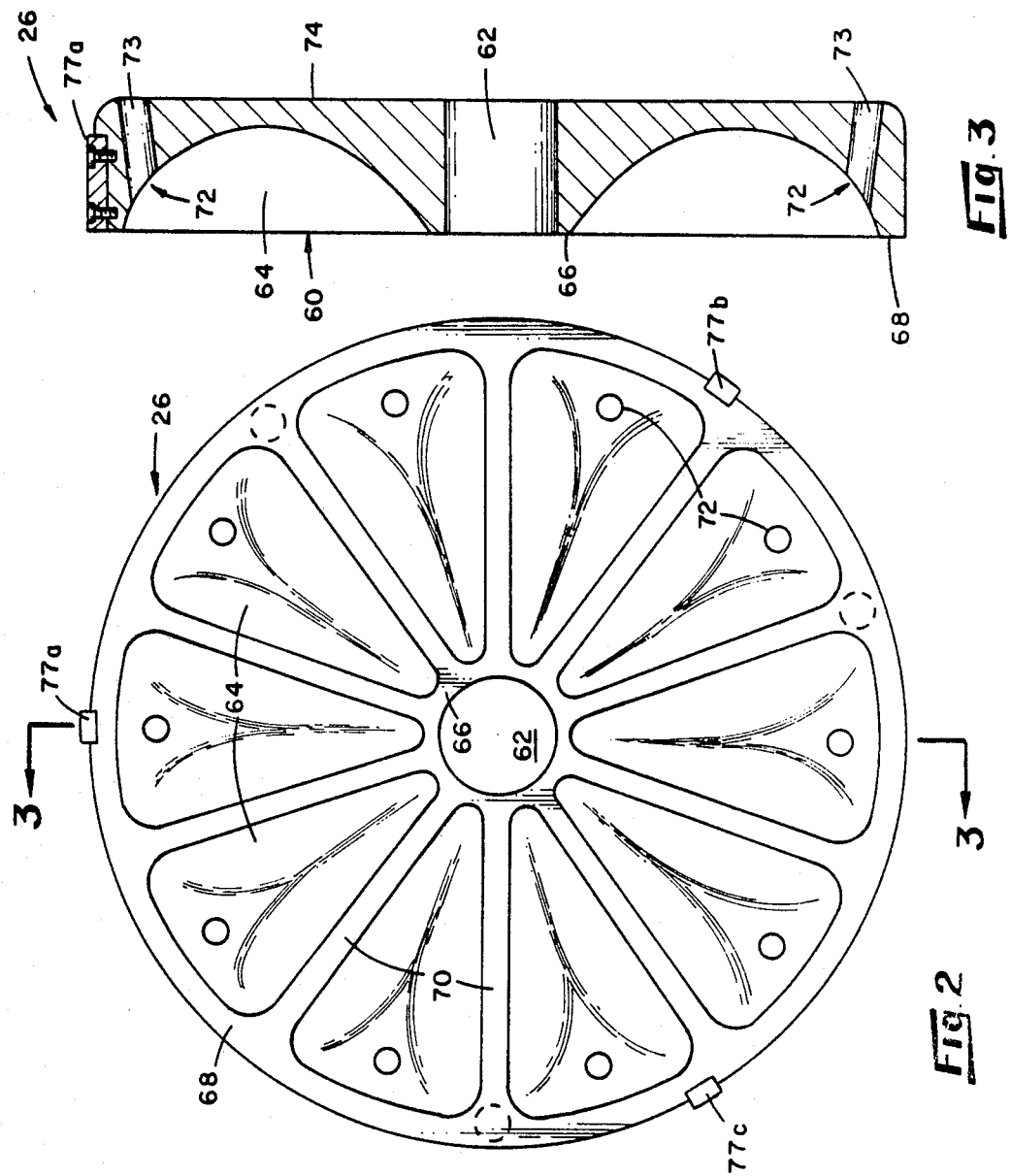

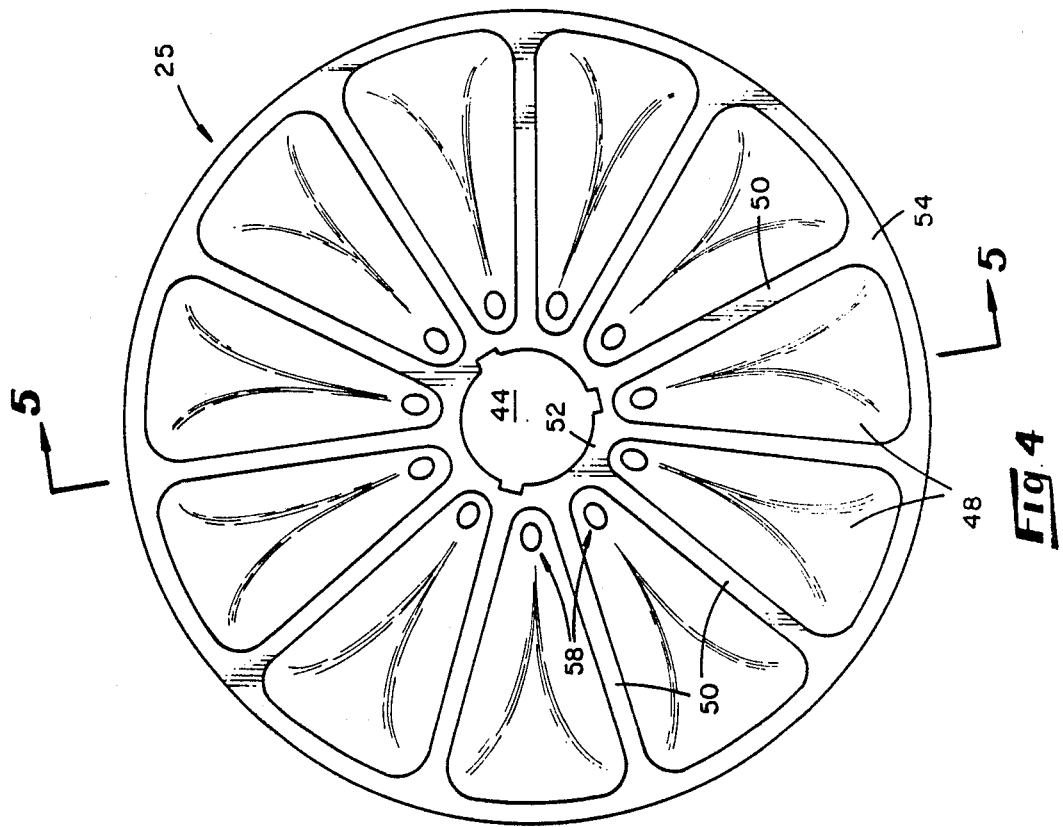
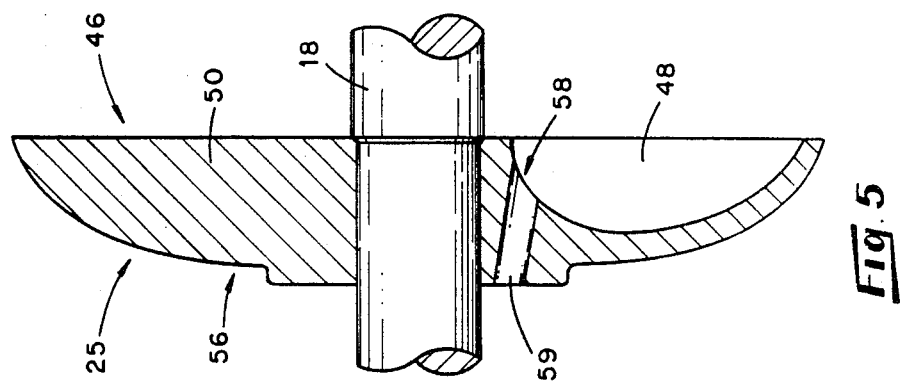

HYDRAULIC DYNAMOMETER

The present invention relates to hydraulic and more particularly relates to a hydraulic dynamometer with improved liquid distribution and circulation characteristics which can be operated over a wide range of conditions.

Various dynamometers have been developed for the purpose of testing engines to determine the horsepower/torque output of engines. For example, hydraulic dynamometers are frequently used in the testing of automotive engines which are being developed or modified for use in motor sports competition. A typical hydraulic dynamometer includes a housing providing a working compartment for at least one rotor and at least one stator with the rotor mounted for rotation on an input shaft and a stator positioned in the working compartment adjacent to the rotor. The rotor and stator have vanes, pockets, or other fluid active elements which, when the working compartment is supplied with liquid, create shear forces in the liquid between the rotor and stator which causes a braking force to be applied to the rotor and a corresponding torque to be applied the stator and ultimately to the housing. Typically, the liquid is circulated through the dynamometer to prevent the build-up of heat. The horsepower of an engine connected to the input shaft can be measured by observing both the torque applied to the housing and by measuring the engine RPM's.

Most dynamometers are intended for use with engines having a particular horsepower output range. Within this range the dynamometer is capable of applying a braking force that exceeds the engine power output. The braking force of a typical dynamometer increases with increasing rotor RPM's and is adjusted for different operating conditions by adjusting the amount of liquid contained in the working compartment of the dynamometer. Additional liquid results in an increased braking force and less liquid decreases the braking force. Adjustment of the liquid is usually accomplished by changing the relative size of a liquid inlet and/or outlet so that more or less of the circulating liquid is present in the working compartment.

While conventional dynamometers work adequately within a relatively narrow engine power output range, they are not suitable for many engines. For example, when smaller engines are tested at high RPMs, the water in the dynamometer must be decreased sufficiently so that braking force provided by the dynamometer is matched to the power output. Often the water volume must be decreased to the extent that instability due to high water temperature and poor flow results in cavitation. In some cases, a dynamometer running with insufficient water will overheat locally and produce steam which prevents accurate results and can damage the dynamometer due to erosion of metal surfaces.

At the other extreme, if the engine has a greater horsepower and exceeds the maximum braking force provided by the dynamometer when completely filled with water, the dynamometer cannot absorb the power output of the engine and cannot be used to measure the output of such engines.

Due to these and other problems, known dynamometers are not well-suited for precision research and development and cannot achieve the necessary 0.2% to 0.3% repeatability of results for many automotive engines used in competition.

It is accordingly an object of the present invention to provide a hydraulic dynamometer with improved liquid distribution and flow characteristics.

It is another object of the present invention to provide a hydraulic dynamometer which can be adjusted within a large range to accommodate most automotive engines.

These and other objects and advantages of the present invention may be more fully understood and appreciated by reference to the following detailed description and accompanying drawings in which:

FIG. 2 is a front view of the face of a stator employed in the preferred dynamometer of FIG. 1;

FIG. 3 is a cross-sectional view taken along line 3—3 of FIG. 2;

FIG. 4 is a front view of the face of a rotor of employed in the preferred dynamometer of FIG. 1;

Figure 1:
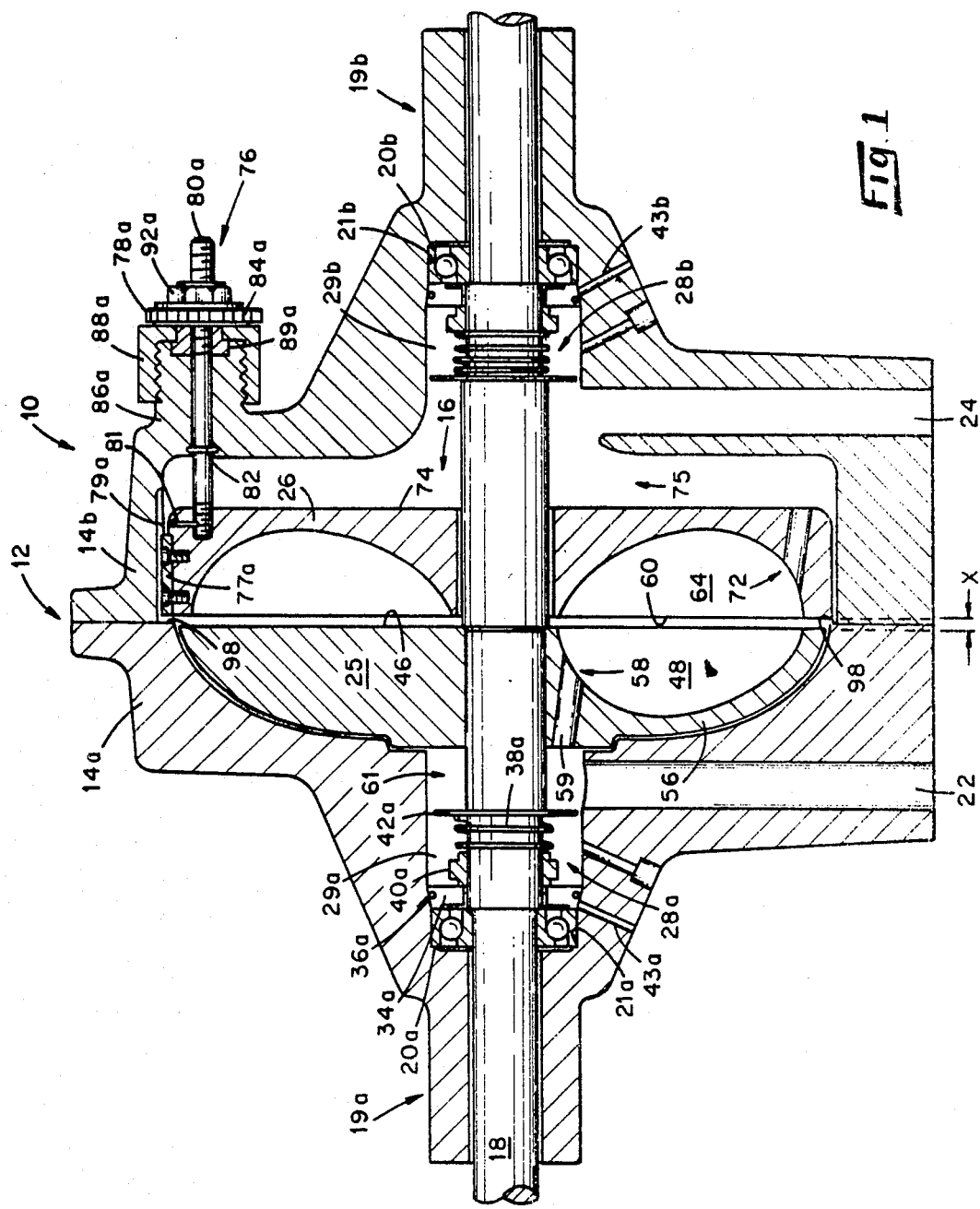
FIG. 1 is a cross-sectional view of a preferred form of a dynamometer, according to the present invention.
Figure 6:
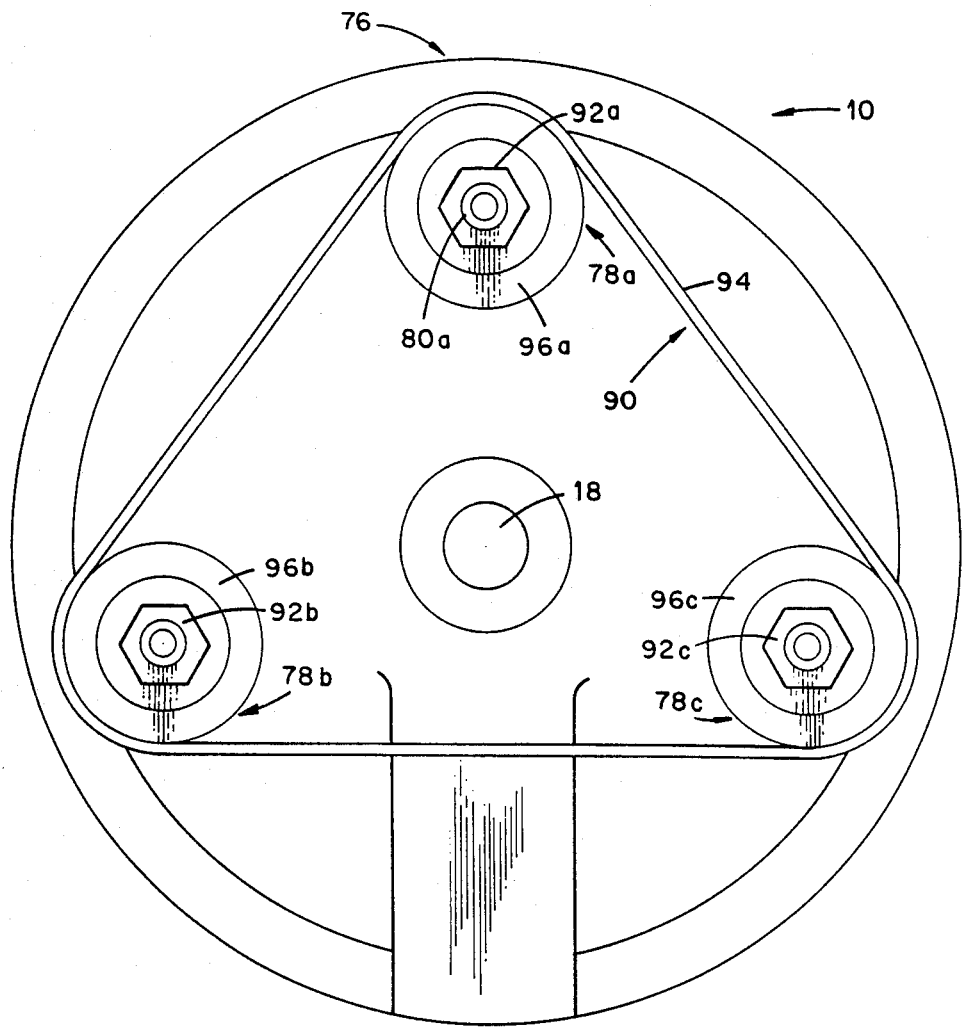
Figure 7:
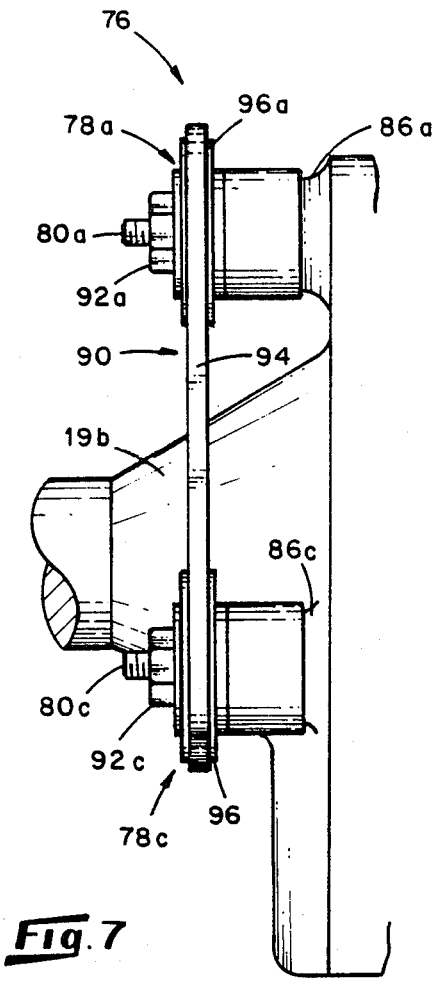

FIG. 5. is a cross-sectional view taken along line 5—5 of FIG. 4;

FIG. 6 is an end view of the dynamometer of FIG. 1 showing the exterior components of a stator-rotor clearance adjustment system in accordance with a preferred form of the invention; and FIG. 7 is a partial side view of the dynamometer of FIG. 1 showing the exterior components of the stator-rotor clearance adjustment system.

Generally a hydraulic dynamometer in accordance with the present invention includes a housing defining an interior working compartment and within which an input shaft is journalled. A rotor having a rotor face is mounted on the input shaft within the working compartment for rotation about a shaft axis. A stator is provided in the housing adjacent to the rotor and has a stator face spaced-apart from and facing the rotor face to define a rotor-stator clearance space therebetween. The rotor face has a plurality of fluid active elements and the stator face has a plurality of fluid active elements which, when the interior compartment is supplied with liquid, interact with the liquid to brake the rotation of the rotor. In one form of the invention, a plurality of inlets in the rotor face supply liquid to the rotor-stator clearance space. In the preferred form of the invention, the rotor and stator fluid active elements are pockets recessed into the face of said rotor and stator and orifices are provided in the rotor and stator so that liquid is supplied into the rotor pockets and is discharged from the stator pockets. Also in accordance with the invention, a mechanism is provided to adjust the rotor-stator clearance space to adjust the operating characteristics of the dynamometer.

Referring now to the drawings in which like reference characters designate like or corresponding parts throughout the several views, there is shown in cross-section in FIG. 1 a preferred form of a dynamometer 10 according to the present invention. The dynamometer 10 includes a housing 12 which is formed from left and right castings designated by reference characters 14*a* and 14*b*, respectively. The left and right castings 14*a* and 14*b* are attached together with bolts (not shown) or other such fasteners to provide an interior working compartment 16 within the housing 12. The housing 12 further provides access for an input shaft 18 for connection to an engine (not shown) and houses left and right shaft bearings 20*a* and 20*b* which support the input shaft 18 for rotation. A water inlet 22 is provided in the left casting 14a for supplying water to the working compartment 16 as will be described in more detail hereinafter. Similarly, a water outlet 24 is provided in the right casting 14b to allow water to flow out of the dynamometer 10 as will also be described in more detail. A rotor 25 is mounted on the input shaft 18 to rotate within the working compartment 16. A stator 26 is provided at a closely adjacent position to the rotor 25 and is mounted as will be described.

The left shaft bearing 20a is suitably provided by a radial load bearing such as the ball bearing depicted in FIG. 1. The bearing 20a is secured, such as by friction fitting, in a left bearing recess 21a which is accessible from the working compartment 16. The recess 21a is preferably provided in a left casting extension 19a which extends about the shaft 18 to the left from the working compartment 16. Similarly, the right shaft bearing 20b is a also a radial load ball bearing as depicted in FIG. 1. The bearing 20b is friction fitted within a right bearing recess 21b provided in a right casting extension 19b which extends about the shaft 18 to the right from the working compartment 16. The bearings 20a and 20b also prevent the shaft from moving longitudinally since the input shaft 18 increases in diameter to the right of the left shaft bearing 20a and the left of the right shaft bearing 20b so that the shaft is not free to drift.

The input shaft 18 is sealed against liquid leakage from the working compartment 16 by left and right mechanical seal assemblies 28a and 28b, respectively. Each of the seal assemblies 28a and 28b are associated with the left and right bearings 20a and 20b, respectively, and prevent liquid from coming into contact with the bearings. The seals 28a and 28b are provided within left and right seal recesses 29a and 29b, respectively, which are provided within the housing extensions 19a and 19b, respectively, and which merge into the bearing recesses 21a and 21b. Since the left seal assembly 28a is substantially identical to the right seal assembly 28b, only the left seal assembly 28a will be described in detail. The left seal assembly 28a is provided within a left shaft recess 29a adjacent to the bearing 20a. To the right of the bearing, the left mechanical seal assembly 28a includes outer seal member 34a having a resilient outer portion which contacts a tapering region 36a of the left seal recess 21a to prevent liquid from leaking past the outside of the seal. A shaft seal member 40a provides a seal to the input shaft and contacts seal member 34a to enable rotation of the haft seal member 40a in relation to seal member 34a without liquid leakage between the seals. A spring 38a is employed to urge the shaft seal member 40a in contact with seal member 34a with the spring 38a acting against washer 42a which is prevented from sliding inwardly by means of a further enlargement of the input shaft 18. Drains 43a and 43b are provided in the housing 12 in the lower side of each of the housing extensions 19a and 19b to drain liquid which may leak past seal assemblies 28a and 28b.

Referring now to FIGS. 1, 4 and 5, the rotor 25 is coaxially mounted on the input shaft 18 which extends through a central bore 44 in the rotor 25. In the preferred embodiment, the rotor 25 is prevented from sliding to the right on the input shaft by means of a further enlargement in shaft diameter and the rotor is keyed to the shaft 18 to prevent relative rotation between the shaft and the rotor.

Referring still to FIGS. 1, 4 and 5, the rotor 25 includes a rotor working face 46 which is oriented to face towards the right and thus towards the stator 26 as indicated in FIG. 1. As shown most clearly in FIG. 4, the working face 46 is provided with eleven (11) pockets 48 which are recessed into the working face 46. The pockets 48 are substantially identical and generally have a pie-shape when the working face is viewed as in FIG. 4. The pockets 48 are shaped and dimensioned so that eleven (11) vanes 50 with substantially the same thickness are provided between each of the pockets 48. The pockets further define a central ring 52 which encircles the central bore 44 and an outer ring 54 both of which have a similar thickness to the vanes at the perimeter of the working face 46. The surfaces of the central ring 52, outer ring 54, and vanes 50 lie substantially in a plane perpendicular to the shaft axis 18.

As shown in cross-section in FIG. 5, the pockets 48 have a generally semi-ovular cross-section in a plane bisecting a pocket 48 with somewhat greater pocket depth adjacent to the central bore 44. As is shown in FIG. 5 and in FIG. 1, the non-working face 56 of the rotor 25 curves to the right to provide the face 56 with a bowl-shaped cross-section. In the preferred embodiment depicted, the interior walls of the housing defining the working compartment 16 adjacent the face 56 conform generally to the shape of the face with a small clearance, so that only small quantities of liquid can flow through the clearance. A clearance of approximately 0.005 to 0.010 inches is suitable Provision is made for introducing liquid supplied to the liquid inlet 22 into the rotor pockets 48. Preferably, this is accomplished by providing orifices 58 in the rotor pockets 48 which introduce liquid supplied to inlet 22 into the pockets 48. Most preferably, the orifices 58 are provided in each of the eleven (11) rotor pockets 48 and are provided adjacent the central bore 44 of the rotor 25 so that liquid is discharged into the rotor pockets 48 close to the central bore 44 and the shaft axis 18. As shown in FIG. 1, a supply of fluid to the orifices 58 is suitably provided by a fluid bore 59 for each orifice 58 which extends from the pockets 48 to the non-working face 56. An open area 61 about the shaft 18 and between the left seal recess 29a and the central portion of the non-working face 56 of the rotor 25 serves as a manifold for the bores 59 and liquid supplied through inlet 22 and into the open area 61 is thereby distributed to the pockets 48.

Referring now to FIGS. 1, 2 and 3, the stator 26 is mounted in the working compartment 16 with the stator working face 60 oriented towards the left and thus towards the rotor working face 46. As shown most clearly in FIGS. 2 and 3, the stator 26 includes a stator central opening 62 which is of sufficient size to provide clearance for free rotation of the input shaft 18 while preventing a substantial flow of liquid through the clearance space. A suitable clearance is, for example, approximately 0.010–0.020 inches. The stator 26 has a generally cylindrical shape and the right casting 14b of the housing 12 conforms to the periphery of the stator to prevent substantial liquid flow around the outside of the stator 26. In addition, a clearance of, for example, 0.010–0.020 inches is provided to enable movement of the stator 26 as will be explained hereinafter. Similar to the rotor 25, the stator 26 is provided with generally pieshaped stator pockets 64 recessed into the stator face 60 although the stator 26 includes ten (10) pockets instead of eleven (11). Thus, a stator inner ring 66, a stator outer ring 68, and ten (10) stator vanes 70 are provided on the working face 60. The surfaces of the stator inner ring 66, stator outer ring 68 and stator vanes 70 lie generally in a plane perpendicular to the input shaft axis. As shown in FIG. 3, the stator pockets 64 also have a generally semi-ovular cross-section with the greatest pocket depth being located somewhat towards the stator outer ring 68.

Provision is made in the stator for liquid in the stator pockets 64 to flow out of the the stator pockets 64. Preferably, this is accomplished by orifices 72 in the pockets 64. Most preferably, each of the ten (10) stator pockets 64 is provided with an orifice adjacent the outer ring 68 as shown in FIGS. 2 and 3. The orifices are preferably provided by fluid bores 73 which extend from the pockets 64 to a non-working face 74 of the stator. As shown in FIG. 1, a liquid collection area 75 defined by the walls of the housing and the non-working face 74 of the stator 26 receives liquid from the bores 73 and is in fluid communication with fluid outlet 24. Liquid received into the liquid collection area 75 flows out of the dynamometer 10 through outlet 24.

Referring to FIGS. 1, 6 and 7, a rotor-stator adjustment mechanism 76 is employed in the preferred form of the invention. As shown in FIG. 1, the liquid collection area 75 of the working compartment 16 is sufficiently large that the stator 26 can be moved toward and away from the rotor 25 to adjust the distance between the working face 60 of the stator 26 and the working face 46 of the rotor 25 which defines a rotor-stator clearance space having a dimension designated by the letter "x." In the preferred embodiment, the rotor-stator clearance can be adjusted to change to "friction" or torque-absorbing characteristics of the dynamometer.

Referring to FIGS. 1, 2, and 3, in order for the stator 26 to be movable in relation to the rotor 25 within the housing 12, the stator 26 is mounted so that it is free to move along the axis of the shaft 18 by the operation of the stator adjustment system 76. In addition, the stator is prevented from rotating. In the preferred embodiment, the stator 26 is in effect "splined" to the right casting 14b of the housing 12 by means of three spline members 77a, 77b, and 77c. The spline members 77a, 77b, and 77c are fitted within generally equally spaced-apart grooves in the periphery of the stator and are fastened by suitable means such as the hex socket head screws depicted in FIGS. 1 and 3. The left housing 14b is provided with three corresponding spline grooves (only groove 79a is depicted in FIG. 1) for receiving the spline members and the stator is thereby prevented from rotating relative to the housing 14b. Sufficient clearance such as approximately 0.005-0.007 inches is provided between the spline members and the surfaces in the grooves to restrict radial movement of the stator 26 yet enable movement of the stator 26 along the axis of the shaft 18 by the stator adjustment system 76.

The rotor-stator adjustment mechanism 76 includes three (3) stator adjustment assemblies 78a, 78b and 78c. As shown in FIG. 6, the stator adjustment assemblies 78a, 78b, and 78c are attached to the right casting 14b and are arranged in a spaced-apart triangular arrangement about the input shaft 18. All three stator adjustment assemblies 78a, 78b and 78c are essentially identical in the preferred embodiment and thus only adjustment assembly 78a shown in FIG. 1 will be described in detail hereinafter.

The stator adjustment assembly 78a includes a pin 80a which extends from the exterior of the housing 12 through a bore into the working compartment 16 above and generally parallel with the input shaft 18. As illustrated, the pin 80 is free to slide through the bore in the housing 12 and is provided with a seal 82 which prevents leakage from the working compartment 16 around the pin 80a. The pin 80a is also threadably secured to the non-working face 74 of the stator 26 and is prevented from rotation by securing pin 81 as shown in FIG. 1. The adjustment assembly 78a provides for controlled movement of the pin 80a to move the stator 26 in relation to the rotor 25. In the preferred embodiment depicted in FIG. 1, this is accomplished by adjustment nut 84a which is threadably connected to the pin 80a on the exterior of the housing 12. The adjustment nut 84a is prevented from movement other than rotation by means of housing extension 86a and adjustment nut cap 88a which is threadably fitted over the housing extension 86a to confine a flanged portion 89a of adjustment nut 84a within the adjustment nut cap 88a.

To maintain the stator working face 60 generally parallel to the rotor working face 46 during adjustment of the rotor stator clearance space "x," the stator adjustment assemblies 78a, 78b and 78c are operated simultaneously. The preferred embodiment employs a belt drive system 90 shown in FIGS. 6 and FIG. 7 which is used to rotate the adjustment nuts 84a, 84b, and 84c on each such assembly uniformly and thus move the pins 80a, 80b, and 80c of each assembly the same distance. The belt system 90 includes pulleys 96a, 96b, and 96c, which are attached to the adjustment nuts 84a, 84b, and 84c, respectively, by means of a fastener such as nuts 92a, 92b, and 92c. A belt or chain 94 connects the pulleys of each of the stator adjustment assemblies so that the rotation of one adjustment nut results in the simultaneous rotation of the other two adjustment nuts.

In the preferred embodiment depicted, the clearance "x" is adjustable between a minimum clearance of about 0.060 inches which is determined by stop surfaces 98 on the left casting 14a which contact the periphery of the stator working face 60 and stop the travel of the stator 26 toward the rotor 25. The maximum clearance is at least 0.93 inches.

In operation, the dynamometer 10 according to the present invention is used to determine the horsepower output of an engine in a manner similar to known dynamometers. The dynamometer is mounted so that torque applied to the housing 12 can be measured such as by mounting the dynamometer with pillow blocks at the casting extensions 19a and 19b of the housing 12 and connecting a force measuring apparatus (not shown) to the dynamometer by means of a torque arm (not shown). An engine (not shown) is connected to the input shaft 18 and rotates the rotor 25 within the working compartment 16. A liquid, such as water, is supplied to the inlet 22 and the liquid is directed into the open area 61, through the fluid bores 59, and out of the orifices 58 and into the rotor pockets 48. Due to the impelling action of the rotor 25, the liquid introduced into the rotor pockets 48 is directed into the stator pockets 64 where at least some of the liquid continuously flows out of orifices 72 through bores 73 and into the collection area 75. By adjusting the flow of the liquid by controlling the pressure and volume of fluids supplied through the inlet 22 and out of the outlet 24 by means such as valves or other flow restrictors (not shown), the amount of fluid in the working compartment is controlled. The amount of water in the area between the rotor 25 and stator 26 determines the shear forces on the liquid created by the rotating action of the rotor in relation to the stator and thus varies the braking action. Since the number of pockets in the rotor 25 is different from the number in the stator, smooth braking without vibration is promoted. The engine RPM's and the torque applied to the housing 12 are measured as is known in the art to determine horsepower output of the engine.

Due to the small clearances between the non-working face 56 of the rotor 25 and the housing, between the input shaft 18 and the central opening 62 of the stator 26, and between the housing and the periphery of the stator, the predominant flow of circulating liquid is into the rotor pockets 48 through the rotor-stator clearance space, and out through the orifices 72 in the stator pockets 64.

To adjust for an engine which has a smaller horsepower output when it would otherwise be necessary to decrease the liquid in the dynamometer to extremely low levels, the rotor stator clearance "x" is increased by means of the stator adjustment system 76. Rotation of any of the adjustment nuts 84a, 84b, or 84c result in simultaneous movement of all of the nuts to evenly adjust the clearance between the rotor and stator. The braking action is thus decreased to match the engine output when a moderate water level is used in the dynamometer 10 to determine horsepower as described above.

To accommodate an engine with a greater horsepower output, the rotor-stator clearance "x" is decreased accordingly which increases the shear forces applied to the fluid by the rotor and the stator and thus increases the braking capacity of the dynamometer 10.

The dynamometer according to the present invention provides a directed fluid flow through the dynamometer which enables a wide variety of liquid levels to be present in the working compartment thereby reducing the occurrence of localized heating and cavitation. The fluid is introduced into the rotor pockets 48 adjacent to the shaft 18 and is directed into the stator pockets 64 and is discharged from the outlet orifices 72 in the stator pockets adjacent to the outer periphery of the stator 26. This directed flow, even at low liquid levels, provides for more uniform water temperatures throughout the dynamometer 10 and provides a more easily controlled, stable, and durable dynamometer. Moreover, the dynamometer according to the invention has an enhanced braking capacity range due to the ability to adjust the rotor-stator clearance to match a particular horsepower output of an engine being tested and can provide more control and accurate measurements over a wide horsepower range. By employing dynamometers according to the present invention in different sizes, precision research and development related to most automotive engines can be performed.

While a preferred embodiment of the present invention has been shown and described in the foregoing detailed description, it will be understood that there is no intent to limit the invention to the specific embodiment but rather it is intended to encompass all modifications falling within the spirit and scope of the invention as set forth in the appended claims.

What is claimed is:

1. A hydraulic dynamometer comprising:
   a housing defining a working compartment;
   a shaft having a shaft axis journalled in said housing and extending into said working compartment;
   a rotor having a rotor face mounted on said shaft in said working compartment for rotation about said shaft axis;
   a stator mounted in said housing having a stator face facing and spaced-apart from said rotor face to define a rotor-stator clearance space in said working compartment;
   said rotor face having a plurality of rotor fluid active elements and said stator face having a plurality of stator fluid active elements, said rotor and stator fluid active elements being circumferentially arranged about said shaft axis;
   liquid supply means for providing a flow of liquid into said working compartment, said liquid supply means comprising a plurality of inlets in said rotor face adapted to supply liquid to said rotor-stator clearance space;
   liquid collection means for discharging liquid from said working compartment; and
   whereby liquid supplied to said working compartment interacts with said rotor and stator fluid active elements to apply braking forces to said rotor.

2. The dynamometer of claim 1 wherein said liquid collection means comprises at least one collection outlet in said stator face.

3. The dynamometer of claim 1 wherein said rotor fluid active elements comprise pockets in the face of said rotor and said stator fluid active elements comprise pockets in the face of said stator.

4. The dynamometer of claim 3 wherein said liquid supply means comprises a plurality of supply orifices with a supply orifice being provided to supply liquid to each of said rotor pockets.

5. The dynamometer of claim 3 wherein said inlets supply fluid into said rotor pockets at a position adjacent to said input shaft.

6. The dynamometer of claim 5 wherein said liquid collection means comprises a plurality of collection orifices with a collection orifice being provided to receive liquid from each of said stator pockets 7. The dynamometer of claim 6 wherein said plurality of collection orifices receive liquid from said stator pockets adjacent to the periphery or said stator.

8. The dynamometer of claim 7 wherein said liquid supply means and said liquid collection means provide liquid circulation through the working compartment with the predominant flow being into said rotor pockets, through said rotor stator clearance space and out through said stator pockets.

9. The dynamometer of claim 1 further comprising means for adjusting the rotor stator clearance space without disassembly of the dynamometer.

10. A hydraulic dynamometer comprising:
    a housing defining a working compartment and adapted to contain a supply of liquid within said working compartment;
    a shaft having a shaft axis journalled in said housing and extending into said working compartment;
    a rotor having a rotor face mounted on said shaft in said working compartment for rotation about said shaft axis;
    a stator provided in said housing having a stator face facing and spaced-apart from said rotor face to define a rotor-stator clearance space;
    liquid circulation means for circulating liquid through said working compartment;
    said rotor face having a plurality of rotor fluid active elements and said stator face having a plurality of stator fluid active elements, said rotor and stator fluid active elements being circumferentially arranged about said shaft axis and interacting with liquid in said working compartment to apply braking forces to said rotor; and clearance adjustment means for moving said stator and said rotor in relation to one another and to said housing to decrease or increase said rotor-stator clearance space without movement of said housing or disassembly of said dynamometer 11. The dynamometer of claim 10 wherein said stator is movable in relation to said rotor to adjust said rotor-stator clearance space.

12. The dynamometer of claim 11 wherein said means for moving said stator in relation to said rotor maintains said stator face in an orientation generally perpendicular to said input shaft as said stator is moved.

13. A hydraulic dynamometer comprising:
a housing defining a working compartment;
a shaft having a shaft axis journalled in said housing and extending into said working compartment;
a rotor having a rotor face mounted on said shaft in said working compartment for rotation about said shaft axis;
a stator provided in said working compartment of said housing and having a stator face facing and spaced-apart from said rotor face to define a rotor-stator clearance space;
means for supporting said stator in said working compartment of said housing for movement in relation to said rotor to adjust said rotor-stator clearance space with said stator face oriented generally perpendicular to said input shaft;
liquid circulation means for circulating liquid through said working compartment;
said rotor face having a plurality of rot-r fluid-active elements and said stator face having a plurality of stator fluid active elements, said rotor and stator fluid active elements being circumferentially arranged about said shaft axis and interacting with liquid in said working compartment to apply braking forces to said rotor; and
clearance adjustment means for moving said stator in relation to said rotor to decrease of increase said rotor-stator clearance space without disassembly of said dynamometer, said clearance adjustment means comprising a plurality of adjustment assemblies attached to said housing and spaced-apart from each other, said assemblies being operable in unison to move said stator.

14. The dynamometer of claim 10 wherein said rotor fluid active elements comprise pockets in the face of said rotor and said stator fluid active elements comprise pockets in the face of said stator.

15. A hydraulic dynamometer comprising:
a housing defining a working compartment and adapted to contain a supply of liquid in said working compartment;
a shaft having a shaft axis journalled in said housing and extending into said working compartment;
a rotor having a rotor face mounted on said shaft in said working compartment for rotation about said shaft axis;
a stator provided in said housing having a stator face facing and spaced-apart from said rotor face to define a rotor-stator clearance space;
said rotor face having a plurality of rotor fluid active elements comprising rotor pockets in said rotor face and said stator face having a plurality of stator fluid active elements comprising stator pockets in said stator face, said rotor pockets and stator pockets being circumferentially arranged about said shaft axis and interacting with liquid in said working compartment to apply braking forces to said rotor;
liquid circulation means for circulating liquid through said working compartment and comprising at least one orifice in said rotor face for supplying liquid to said rotor pockets; and
clearance adjustment means for moving said stator and said rotor in relation to one another to decrease or increase said rotor-stator clearance space without disassembly of said dynamometer.

16. The dynamometer of claim 15 wherein said liquid circulation means comprises at least on orifice in said stator face for receiving liquid from said stator pockets to discharge liquid from said working compartment.

17. The dynamometer of claim 16 wherein said liquid circulation means acts to circulate a predominant amount of the liquid circulated through the working compartment by circulation through the rotor-stator clearance space.

* * * * *

UNITED STATES PATENT AND TRADEMARK OFFICE
CERTIFICATE OF CORRECTION

PATENT NO. : 4,864,872
DATED : September 12, 1989
INVENTOR(S) : Stahl, Jere F.

It is certified that error appears in the above-identified patent and that said Letters Patent is hereby corrected as shown below:

On the title page,
in the Abstract line 1, insert --The specification discloses-- before "A".
Delete "A" and insert --a--.

Column 1, line 1, after hydraulic and before "and", insert --dynamometer--.

Column 3, line 48, after "the" and before "seal", delete "haft" and insert --shaft--.

Column 8, line 37, after "pockets", insert -- . -- (period).

Column 8, line 48, after "rotor", insert -- - -- (hyphen).

Column 9, line 33, delete "rot-r", and insert --rotor--.

Column 9, line 41, after "decrease", delete "of", and insert --or--.

Column 10, line 23, delete "face,said", and insert --face, said--.

Column 10, line 37, after "least", and before "orifice", delete "on", and insert --one--.

Signed and Sealed this

Sixteenth Day of October, 1990

*Attest:*

HARRY F. MANBECK, JR.

*Attesting Officer*   *Commissioner of Patents and Trademarks*